(12) United States Patent
Avellone et al.

(10) Patent No.: US 7,123,929 B2
(45) Date of Patent: Oct. 17, 2006

(54) METHOD AND DEVICE FOR SYNCHRONIZATION AND IDENTIFICATION OF THE CODEGROUP IN CELLULAR COMMUNICATION SYSTEMS AND COMPUTER PROGRAM PRODUCT THEREFOR

(75) Inventors: Giuseppe Avellone, Palermo (IT); Francesco Rimi, Alcamo (IT); Francesco Pappalardo, Paternò (IT); Agostino Galluzzo, Palma di Montechiaro (IT); Giuseppe Visalli, Messina (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 524 days.

(21) Appl. No.: 10/717,433

(22) Filed: Nov. 18, 2003

(65) Prior Publication Data

US 2004/0117419 A1   Jun. 17, 2004

(30) Foreign Application Priority Data

Dec. 13, 2002   (IT)   ................ TO2002A10823

(51) Int. Cl.
*H04B 7/005* (2006.01)
*H04J 3/06* (2006.01)
*H04L 7/00* (2006.01)

(52) U.S. Cl. ............ 455/502; 370/503; 370/509; 375/354

(58) Field of Classification Search ............ 455/502; 370/503, 509, 510, 511, 512, 513; 375/142, 375/354, 149
See application file for complete search history.

(56) References Cited

U.S. PATENT DOCUMENTS

| | | | | |
|---|---|---|---|---|
| 4,636,583 A | * | 1/1987 | Bidell et al. | 380/260 |
| 5,930,366 A | | 7/1999 | Jamal et al. | 325/200 |
| 6,625,200 B1 | * | 9/2003 | Dent | 375/142 |
| 2003/0156574 A1 | | 8/2003 | Raaf | |

FOREIGN PATENT DOCUMENTS

EP    1 154 662 A1    11/2001
WO    WO 00/74276 A1    12/2000

* cited by examiner

*Primary Examiner*—Tilahun Gesesse
(74) *Attorney, Agent, or Firm*—Hogan & Hartson L.L.P.

(57) ABSTRACT

Once slot synchronization has been obtained in a first step, during a second step there is acquired, by means of correlation of the received signal (r) with the synchronization codes, the information corresponding to the codegroup and to the fine slot synchronization. The synchronization codes are split into codesets. In a first step, a synchronization code identifying a corresponding codeset (CS) is identified by means of correlation and search for the maximum value of correlation energy. In a second step, the received signal (r) is correlated with the remaining codes belonging to the codeset identified. The information thus obtained, which corresponds to all the synchronization codes comprised in the codeset identified, is used for obtaining frame synchronization and codegroup identification. Preferential application is in mobile communication systems based upon standards, such as UMTS, CDMA2000, IS95 or WBCDMA.

16 Claims, 3 Drawing Sheets

METHOD AND DEVICE FOR SYNCHRONIZATION AND IDENTIFICATION OF THE CODEGROUP IN CELLULAR COMMUNICATION SYSTEMS AND COMPUTER PROGRAM PRODUCT THEREFOR

BACKGROUND OF THE INVENTION

1. Field of the Invention

The present invention relates to telecommunication techniques and has been developed with particular attention paid to its possible application to telecommunication systems based upon the standard CDMA/3GPP TDD (acronyms for Code Division Multiple Access/Third Generation Partnership Project and Time Division Duplex) 3.84 Mcps option.

2. Description of the Known Art

In order to enable acquisition of a base station by a mobile terminal included in a telecommunication system based upon the standard 3GPP TDD mode or the like, the corresponding receiver needs means capable of performing the function of frame synchronization and identification of the so-called codegroup. The possibility of executing these functions is essential for performing the subsequent steps in the framework of the cell-search system.

In particular, when a mobile terminal is turned on, it does not have any knowledge of the timing of the transmitting cell on which it is to be assigned. The 3 GPP standard then proposes a procedure of initial cell search to acquire the signal of the cell and synchronize therewith.

In the case in question, this procedure consists basically of 3 steps:

1. acquisition of the synchronization slot (this is a "coarse" slot synchronization, where by the term "coarse" is understood the fact that the presence and the rough position of the synchronization channel, or SCH, is acquired, but it is not yet possible to define the initial instant of the slot of which the SCH forms part; in this connection, see FIG. 1 of the annexed drawings [SCH-slot_position]);
2. (fine) slot synchronization, identification of parity of the frame number and identification of the cell codegroup; and
3. identification of the scrambling code (third step) and of the cell parameter.

In the embodiment of the second step described above, it is assumed that the acquisition of the synchronization slot (or SCH slot) has previously been obtained with a first coarse slot synchronization in the course of the first step.

At this point, to obtain fine slot synchronization, define frame parity (i.e., whether the frame number is even or odd), and identify the cell codegroup, to which there is associated the cell offset, in the second step there is used the secondary synchronization channel (SSCH), on which there is transmitted, within each synchronization slot, a set of three codes or words of 256 chips each.

The 3.84 Mcps version of the TDD standard uses a subset of 12 of the 16 secondary synchronization codes already in use for the FDD (Frequency Division Duplex) version.

The sixteen 256-chip complex codes used in the standard are generated on the basis of the following rules:

a first sequence b at a chip-rate with a repetition period equal to 16 (i.e., a repetition every 16 elements) is multiplied by a sequence 16 times slower according to the two formulae given below, to obtain the base sequence z:

$z = <b,b,b,-b,b,b,-b,-b,b,-b,b,-b,-b,-b,-b,-b,>$ $b = <1,1,1,1,1,1,-1,-1,-1,1,-1,1,-1,1,1,-1,>$

The base sequence z is then multiplied, element by element, with a Hadamard code of length 256, which is chosen on the basis of the following rule: defining by m the number identifying the secondary synchronization code (SSC) to be generated, the Hadamard code number by which to multiply the sequence z is equal to $16 \times (m-1)$, with m ranging from 1 to 16.

In the solutions known to the art, for example, from the international patent application WO-A-00/74276, used as model for the preambles of Claims 1 and 6, the performance of the second step of the cell search envisages that the secondary synchronization codes SSC, contained in the secondary synchronization channel (SSCH), are extracted by means of a correlation process. The samples of the received signal are correlated with the possible secondary synchronization codes SSC transmitted on the channel SCCH. There is then identified the set of three codes that has the highest correlation energy, and there are then used the steps associated to the codes of said set of three in order to define, according to the standard, the codegroup parameters and other parameters for frame synchronization, such as slot offset and frame number (even or odd frame).

This solution is schematically represented in the diagram of FIG. 2, where the reference number 10 designates a bank of twelve complex finite-impulse-response (FIR) filters, which are coupled to the twelve possible secondary synchronization codes SSC. The samples of the received signal (r) are sent at input to the bank 10 of FIR filters, and at the twelve outputs of the bank 10 there are generated signals indicating the correlation energies corresponding to said codes SSC. These signals are sent to a system for detecting the maximum value designated by 11.

The system for detection of the maximum value 11 identifies a given number (equal to three) of codes SSC provided with highest correlation energy, which are sent to a comparison block designated by 12.

Block 12 executes an operation of comparison with a table that gives—according to the possible combinations of the phases of the set of three codes SSC identified—corresponding codegroups CD, slot offset OS, and frame number FN, which are then supplied at output from said comparison block 12.

The solution according to the known art, represented in FIG. 2, thus requires a huge number of FIR filters, one for each code SSC of which it is necessary to obtain the correlation energy. This entails a considerable expenditure in terms of memory cells. In fact, a correlator based upon a FIR filter requires $256 \times 2$ memory cells, it being necessary to operate on 256-chip codes SSC. Furthermore, in order to store the signals indicating the correlation energies, further memory cells are necessary. The utilization of a very high number of memory cells implies the use of a considerable area on the chip designed for identification of the codegroup, as well as a considerable power consumption.

Even though in what follows, for reasons of clarity and simplicity of exposition, practically exclusive reference will be made to this application, it is in any case to be borne in mind that the scope of the invention is more general. The invention is in fact applicable to all telecommunication systems in which there arise conditions of operation of the type of the ones described in what follows. By way of non-exhaustive example, reference may be made to satellite telecommunication systems and mobile cellular systems corresponding to the standards UMTS, CDMA2000, IS95 or WBCDMA.

SUMMARY OF THE INVENTION

The purpose of the present invention is to provide a solution capable of performing the functions described previously in a simplified way, so as to be able to provide, for example, a search for the codegroup and of the offset using a simplified hardware, reducing the complexity of calculation and obtaining a corresponding reduction in the memory required and in the power consumption.

According to the present invention, the above purpose is achieved thanks to a method having the characteristics recalled specifically in the claims that follow. The invention also relates to a corresponding device, as well as to the corresponding computer product, directly loadable into the memory of a computer and comprising software code portions for implementing the method according to the invention when the product is run on a computer.

Basically, the solution according to the invention provides for simplifying the size of the memory and of the corresponding processing circuit, moreover reducing the complexity of calculation and the power consumption.

As compared to known solutions, the solution proposed herein, which is based upon a technique of recycling of the acquired data, is simpler, occupies a smaller area, and consumes less power.

BRIEF DESCRIPTION OF THE DRAWINGS

The invention will now be described, purely by way of non-limiting example, with reference to the annexed drawings, in which.

DETAILED DESCRIPTION OF AN EMBODIMENT OF THE INVENTION

Figure 1:
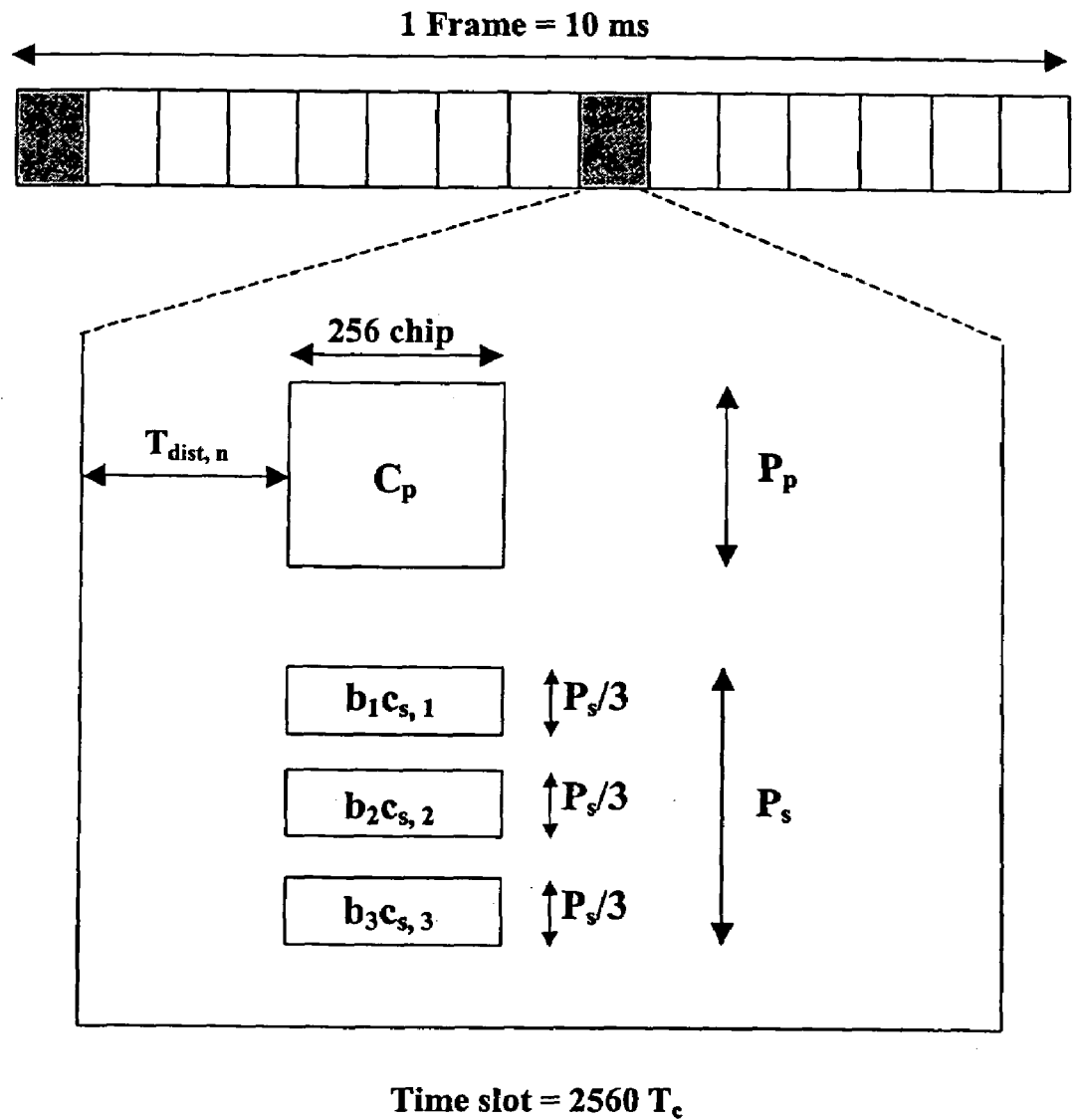
FIGS. 1 and 2, corresponding to the known art, have already been described previously.
Figure 2:
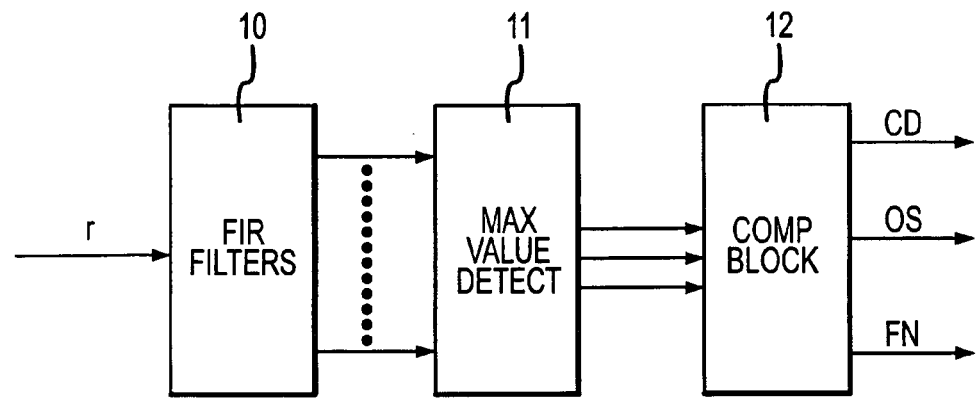

The architecture represented in FIG. 2 does not envisage the received signal (r) being correlated with all the possible secondary synchronization codes SSC. The solution in question derives, in fact, from the observation that, according to the relevant standard (Version TDD 3.84 Mcps), said codes SSC may be grouped together in such a way as to form, at the most, four groups or subsets, called codesets.

Each of said codesets is formed by a given number of codes (in practice, a set of three).

According to the solution described herein, it is therefore the corresponding pairs made up of the codeset and the set of three phases of the codes forming said codeset that identify, in the appropriate tables defined by the standard, the parameters of codegroup, slot offset and frame number to be identified in the second step of the cell search.

The method described herein, which corresponds to the currently preferred embodiment of the invention, divides into a number of parts (or intermediate steps) the second step of the cell search, providing for:

performing, first, identification of the codeset by means of correlation with four codes that identify the four possible codesets; the maximum correlation (in terms of energy) in this part identifies the estimate of the codeset received, and the corresponding phase is stored for being used subsequently;

storing, at the same time, the samples of the received signal;

using the samples of the received signal thus stored for detecting the phase offsets or phases of the two remaining codes belonging to the codeset identified; this is obtained once again by correlating the stored samples of the received signal with the samples of the two remaining codes, according to a preferred version, re-using for this purpose two of the four correlators previously used for determination of the codesets; and searching (according to known criteria) in the standard tables, on the basis of the information available on the codeset and the corresponding phases, the parameters concerned, i.e., the codegroup, the slot offset, and the frame number.

Figure 3:
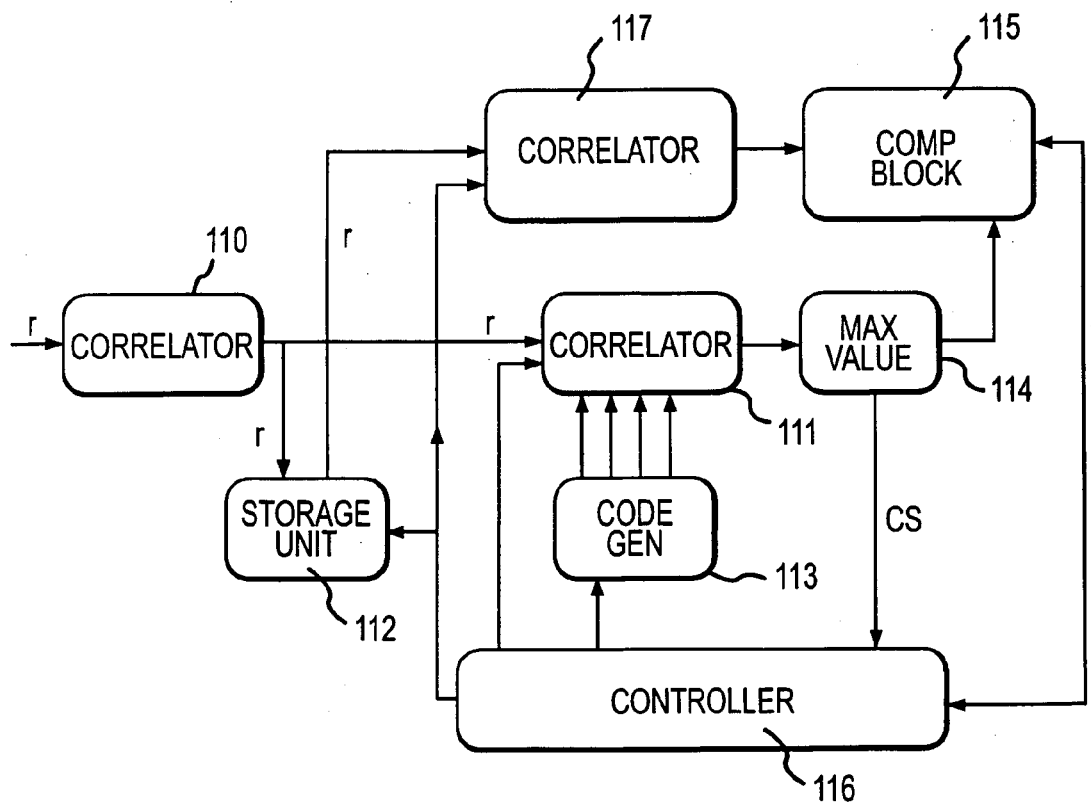
FIG. 3 illustrates, in the form of a block diagram, a first embodiment of an architecture operating according to the invention.

FIG. 3 illustrates a first embodiment of the architecture operating according to the invention, which does not, however, provides for the recycling of correlators.

The received signal (r) goes at input to a block designated by 110, which executes a first operation of correlation on a first 16-chip sequence.

In practice, block 110 can be either a matched filter or a correlator, the purpose of which being to eliminate the first of the two sequences common to all the secondary codes. To be precise, it eliminates the sequence b, which is generated at one chip rate (whilst the second sequence, which can be obtained from the signs of z, is generated at 1/16 of chip rate). It is known that, on account of the way in which the 16 Hadamard sequences of length 256 (if thought at the chip rate) are chosen, they are reduced to sequences of length 16, which can be generated at 1/16 of chip rate. Precisely this peculiarity is exploited for splitting into two parts what should be a correlation on 256 elements.

The received signal (r) at output from block 110 is sent to a bank of correlators 111. The samples of the received signal (r) are moreover stored in a storage unit 112.

The bank of correlators 111 comprises only four correlator circuits, one for each codeset. The bank 111 receives, in fact, from a code-generation system designated by 113, four "first" codes SSC, each belonging to and identifying one of the four possible codesets in the framework of the set of codes SSC.

The codes SSC in question are twelve in all, and each codeset comprises a "first" code, which identifies the set, and a subset of remaining codes, which comprises the two other codes of the set.

The operation of correlation performed in block 111 is thus able to provide at output an estimate of the codeset received.

In this connection, a search unit for seeking the maximum value designated by 114 receives from the bank of correlators 111 the energies corresponding to the four first codes SSC supplied by the system, and supplies at output a first code SSC, provided with the best correlation energy, with corresponding phase. In this way, there is therefore identified a codeset CS to which said first code SSC belongs.

The first code SSC and its phase are to be forwarded to a comparison block 115, whilst the information on the codeset is sent to a controller designated by 116.

The controller 116 presides over operation of the circuit and, in particular, is designed to provide to the code-generation system 113 information on the four "first" codes SSC to be generated to identify the four codesets.

On the basis of the first code and of the corresponding codeset CS identified by means of the search for the maximum value conducted in the unit 114, the controller 116 sends to the code-generation system 113 the information on which other codes SSC it is to generate for the operation of correlation with the received signal r, stored in the storage unit 112.

These other codes are simply the two remaining codes SSC comprised in the subset that completes the codeset corresponding to the first code selected by means of the search conducted in unit 114.

The said other two codes are then sent, together with the samples of received signal stored in the storage unit 112, to a second bank of correlators 117, to which, as to the storage unit 112, the controller 116 sends an enabling signal.

The result of the operation of correlation performed in the second block of correlators 117 (which usually comprises two correlators, each of which correlates the received signal (r) with one of the two remaining codes belonging to the set of three of the identified codeset CS of the unit 114) is basically given by the phases of these two remaining codes.

The corresponding information is sent to block 115, which already has information corresponding to the phase of the first code, identified by means of the operation of correlation performed in block 111, thus completing the information corresponding to the complete codeset CS and enabling the corresponding parameters to be extracted from the table contained in the comparison block 115.

As has already been said, block 115 is basically similar to the comparison block 12 of FIG. 2, with the difference that the search in the standard tables contained therein for obtaining at output the parameters concerned, i.e., the code-group CD, the slot offset OS, and the frame number FN, is performed on the basis of the information available on the codeset and of the phases of the codes SSC belonging thereto, obtained following upon the two correlation steps performed in blocks 111 and 117.

The above involves not all the codes SSC, but only:
the four "first" codes identifying the four codesets; and
the two remaining codes comprised in the codeset selected as
a result of the search performed in the unit 114.

Figure 4:
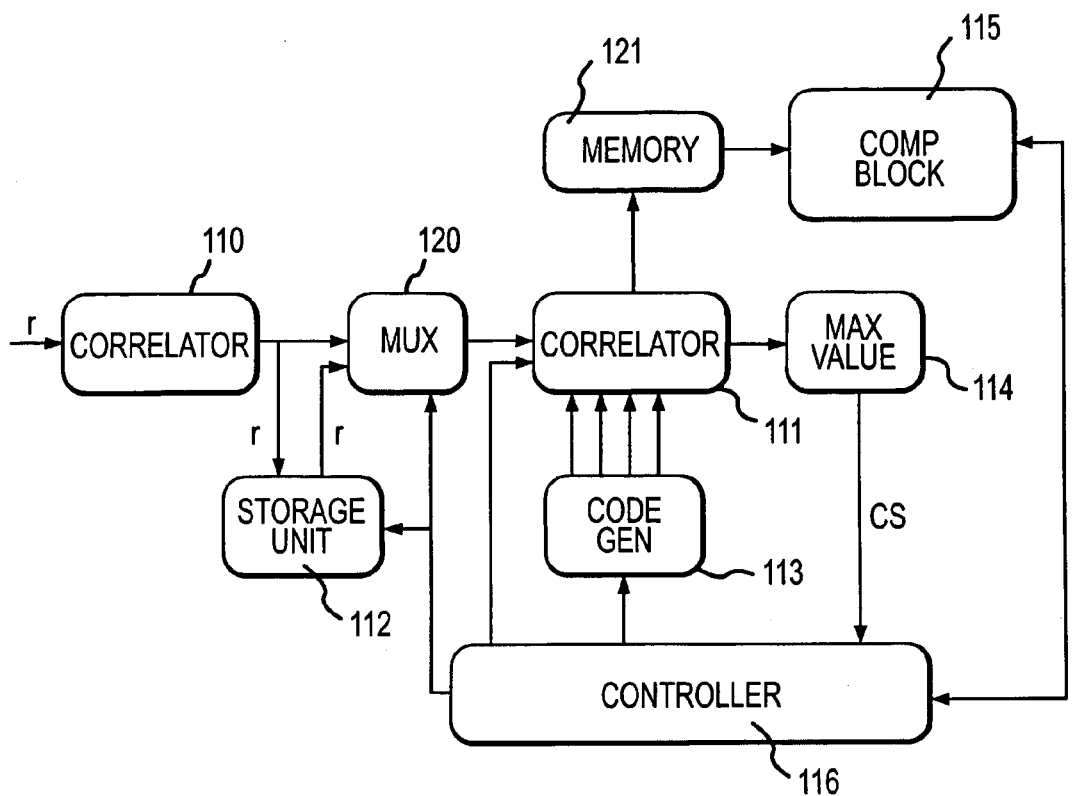
FIG. 4 illustrates a second embodiment of the architecture represented in FIG. 3.

FIG. 4 illustrates an alternative embodiment of the architecture of FIG. 3. In this alternative, the second correlator block (designated by 117 in FIG. 3) has been eliminated and replaced by circuit elements that enable use of the block or bank of correlators 111 for carrying out both of the operations of correlation described previously.

In the diagram of FIG. 4, parts that are identical or functionally equivalent to the ones illustrated in FIG. 3 are designated by the same reference numbers already used in such preceding figure.

In the alternative embodiment of FIG. 4, upstream of block 111, there is provided a multiplexer 120.

Driven by the controller 116, the multiplexer selects, in order to send it on to block 111, the output of block 110 or else the output from the storage unit 112.

In this way, initially, in addition to being stored in the unit 112, the received signal (r) is sent directly to block 111, where it is correlated with the four "first" codes identifying the four codesets coming from block 113.

Subsequently, once the reference codeset has been identified (as a result of the search performed in the unit 114), the samples of the received signal (r) stored in the unit 112 can be sent to block 111 to be correlated with the two remaining codes of the aforesaid codeset.

The bank of correlators 111 is provided, in this architecture, with a memory of the correlator 121, in which the first code SSC of the codeset detected is stored.

In detail, prior to the selection of the maximum value there are preserved the four phases, one for each codeset tested by means of the "first code" of the codeset itself; following upon the selection of the codeset, only the phase, or phase offset, of the corresponding code is kept in memory.

Also in this case, on the basis of the information corresponding to the codeset CS selected, the controller 116 controls the code-generation system 113 in such a way that the latter will generate the two codes corresponding to the two codes that are lacking for composing the set of three of the codeset CS in order to make a correlation with the samples of the received signal (r) stored in the storage unit 112.

The result of this operation of correlation (performed, so to speak, "by recycling" two of the correlators contained in the bank 111) is also supplied to block 115, where the set of three codes of the codeset CS usable is recomposed—with the corresponding phases—for comparison with the standard tables.

Figure 5:
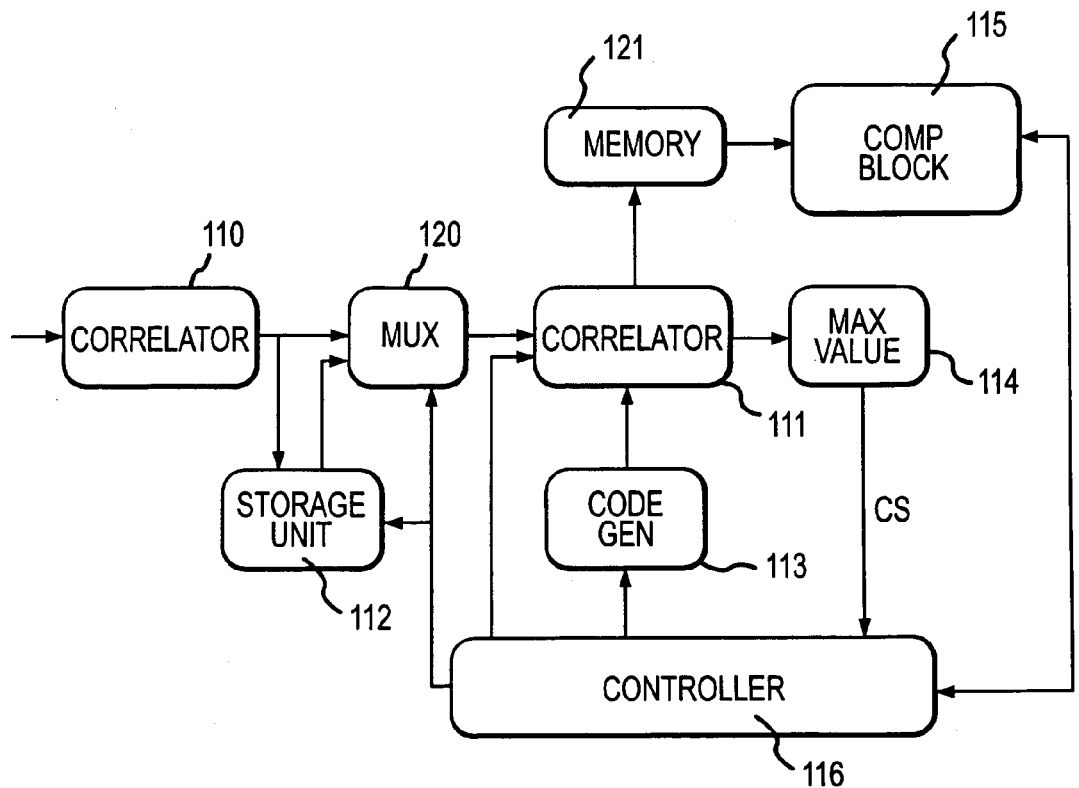
FIG. 5 illustrates a third embodiment of the architecture represented in FIG. 3.

FIG. 5 illustrates yet a further alternative embodiment, which has just one correlator 111 and just one generator of codes SSC 113.

The correlator 111 performs the correlation on the four "first" codes that identify the codesets in serial form, i.e., from time to time by correlating—in four successive sub-operations—one of the four "first" synchronization codes received in sequence from the generation system 113, with the samples of received signal.

In this case, whilst the first sub-operation of correlation can be performed directly on the samples of received signal, the three subsequent homologous sub-operations are performed using samples of received signal taken from the storage unit 112.

In the meantime, the search unit 114 for seeking the maximum value carries out the search for the maximum. It is therefore clear that the result of the first of the four sub-operations of correlation executed in series will be the first relative maximum, and the memory location of this maximum (correlation energy, number identifying the code or the corresponding codeset, corresponding phase of the code), will be updated only if one of the subsequent correlation sub-operations yields as result a higher energy value.

Likewise, once the codeset has been defined, for defining the two phases of the two remaining secondary codes there will be performed—once again in succession, in block 111—the two correlations between the samples corresponding to the two remaining codes of the codeset selected, appropriately generated in the generation system 113 under the control of the controller 116, and the samples stored in the storage unit 112 of the received signal r.

The solution just described enables considerable advantages to be achieved with respect to the known solutions.

Provided herein is an example of the advantages in terms of memory required as compared to the architecture of FIG. 2.

Assuming that each sample at input to the bank 10 is encoded with only six bits, the memory required by these FIR filters is equal to $256 \times 2 \times 12 \times 6 = 36864$ bits, in the case where each FIR filter is provided with its own bank of registers, and $256 \times 2 \times 6 = 3072$ bits in the more favourable case, in which the FIR filters share the same memory.

In order not to have to carry out truncations, a generic buffer at output from the FIR filter must be sized with a dimension $M=6+\log_2 256=14$ bits.

Hence, for the buffers associated to the twelve complex outputs of the FIR filters there are required $24 \times 14=336$ bits. Likewise, for the energies there are required $12 \times 28=336$ bits.

The total memory for the architecture of FIG. 2 is, in the best case, 3744 bits.

The architecture illustrated in FIG. 4 requires, instead, a number $N=6+\log_2 16=10$ bits for the output of the first correlator 110, to be multiplied by 32, to obtain 320 bits.

Furthermore, $8 \times M$ bits ($M=6+\log_2 256$), i.e., $8 \times 14=112$ bits are necessary for the cells at the output of the four correlators contained in the bank of correlators 111 and $4 \times 2M=4 \times 28$, i.e., 112 bits are necessary for the cells that store the energies of the words. In all, a total storage capacity of 544 bits is required.

It may readily be verified that the architecture illustrated in FIG. 5, which acts in a completely serial manner using just one correlator requires only 432 bits.

Such reductions in the size of the memory made available by the method according to the invention determine a substantial reduction of the area employed on the chip for calculation of the codegroups. Furthermore, the solution according to the invention enables a considerable reduction to be achieved in the power consumed.

Of course, without prejudice to the principle of the invention, the details of construction and the embodiments may vary widely with respect to what is described and illustrated herein, without thereby departing from the scope of the present invention, as defined in the claims that follow.

The invention claimed is:

1. A method for performing, as a function of a received signal, fine slot synchronization, definition of frame parity, and codegroup identification in a cellular communication system that uses a plurality of synchronization codes, the method comprising:
   correlating said received signal with at least some of said synchronization codes, obtaining corresponding energy values;
   searching among said energy values, at least one maximum value, identifying, according to said at least one maximum value, a given number of said synchronization codes and the corresponding phases; and
   performing said fine slot synchronization and identifying said codegroup on the basis of said given number of said synchronization codes and of the corresponding phases obtained by means of correlation;
   dividing said synchronization codes into a plurality of possible codesets, each set of said plurality comprising a first synchronization code which identifies the corresponding set, and a codeset of remaining codes;
   correlating said received signal with the first codes of said plurality of possible codesets, the search for said at least one maximum energy value identifying one of said first codes and the corresponding codeset in said plurality;
   correlating said received signal with the remaining codes of said corresponding codeset of said plurality; and
   performing said fine slot synchronization, identification of parity of the frame, and identifying said codegroup on the basis of said one of said first codes, of the remaining codes of said corresponding codeset of said plurality, and of the corresponding phases obtained by means of correlation.

2. The method according to claim 1 further comprising:
   storing said received signal;
   providing a single correlation block; and
   using said single correlation block both for correlating said received signal with the first codes of said plurality of possible codesets and for correlating said received signal with the remaining codes of said corresponding codeset of said plurality, at least one of said correlation operations being implemented on said received signal and stored.

3. The method according to claim 2 further comprising searching said at least one maximum energy value simultaneously to the correlation of said received signal with the first codes of said plurality of possible codesets.

4. The method according claim 1 further comprising:
   storing said received signal;
   providing a single correlation module;
   providing a single generating module for generating said synchronization codes; and
   performing said correlation operations using, serially, said single correlation module and said single generating module for generating said synchronization codes, said correlation operations being implemented, at least in part, on said received and stored signal.

5. The method according to claim 1, wherein said correlation operations are performed by finite-impulse-response filters.

6. A device for performing, according to a received signal, fine slot synchronization and identification of frame parity, and identifying the codegroup in a cellular communication system that uses a plurality of synchronization codes, said device comprising:
   at least one correlator for correlating said received signal with at least some of said synchronization codes, to obtain corresponding energy values;
   a unit for determination of energy values for searching, among said energy values, at least one maximum value, identifying, according to said at least one maximum value, a given number of said synchronization codes and the corresponding phases; and
   a processing module for performing said frame synchronization and identifying said codegroup on the basis of said given number of said synchronization codes and of the corresponding phases obtained by means of correlation;
   wherein said at least one correlator is configured for correlating said received signal:
   with the first codes of a plurality of possible codesets of said synchronization codes, each set of said plurality comprising a first synchronization code which identifies the corresponding set, and a subset of remaining codes so that the search for said at least one maximum energy value by said unit for determination of energy values identifies one of said first codes and the corresponding codeset in said plurality; and
   with the remaining codes of said corresponding codeset of said plurality; and
   wherein said processing module is configured for performing said fine slot synchronization and identification of said frame parity, and identifying said codegroup on the basis of said one of said first codes, of the remaining codes of said corresponding codeset of said plurality, as well as of the corresponding phases obtained by means of correlation.

7. The device according to claim 6, further comprising:

a storage unit for storing said received signal; and a single correlation block configured both for correlating said received signal with the first codes of said plurality of possible codesets and for correlating said received signal with the remaining codes of said corresponding codeset of said plurality, at least one of said correlation operations being implemented on said received signal and stored in said storage unit.

8. The device according to claim 7, wherein said unit for determination of energy values is configured for searching said at least one maximum energy value simultaneously to the correlation, implemented in said at least one correlator, of said received signal with the first codes of said plurality of possible codesets.

9. The device according to claim 6, further comprising:

a storage unit for storing said received signal;

a single correlation module;

a single generating module for generating said synchronization codes; and a controller module configured for operating, in a serial way, said single correlation module and said single generating module for generating said synchronization codes, said correlation operations being implemented, at least in part, on said received signal and stored in said storage unit.

10. The device according to claim 6, wherein said at least one correlator comprises finite-impulse-response filters.

11. The device according to claim 6, further comprising a receiver for a telecommunication system based upon a standard including the group consisting of 3 GPP FDD, UMTS, CDMA2000, IS95, and WBCDMA.

12. A computer product, directly loadable into the memory of a computer and comprising software code portions for implementing, when the product is run on a computer, a method for performing, as a function of a received signal, fine slot synchronization, definition of frame parity, and codegroup identification in a cellular communication system that uses a plurality of synchronization codes, comprising:

correlating said received signal with at least some of said synchronization codes, obtaining corresponding energy values;

searching among said energy values, at least one maximum value, identifying, according to said at least one maximum value, a given number of said synchronization codes and the corresponding phases; and performing said fine slot synchronization and identifying said codegroup on the basis of said given number of said synchronization codes and of the corresponding phases obtained by means of correlation;

dividing said synchronization codes into a plurality of possible codesets, each set of said plurality comprising a first synchronization code which identifies the corresponding set, and a codeset of remaining codes;

correlating said received signal with the first codes of said plurality of possible codesets, the search for said at least one maximum energy value identifying one of said first codes and the corresponding codeset in said plurality;

correlating said received signal with the remaining codes of said corresponding codeset of said plurality; and performing said fine slot synchronization, identification of parity of the frame, and identifying said codegroup on the basis of said one of said first codes, of the remaining codes of said corresponding codeset of said plurality, and of the corresponding phases obtained by means of correlation.

13. The method according to claim 12 further comprising:

storing said received signal;

providing a single correlation block; and using said single correlation block both for correlating said received signal with the first codes of said plurality of possible codesets and for correlating said received signal with the remaining codes of said corresponding codeset of said plurality, at least one of said correlation operations being implemented on said received signal and stored.

14. The method according to claim 13 further comprising searching said at least one maximum energy value simultaneously to the correlation of said received signal with the first codes of said plurality of possible codesets.

15. The method according claim 12 further comprising:

storing said received signal;

providing a single correlation module;

providing a single generating module for generating said synchronization codes; and performing said correlation operations using, serially, said single correlation module and said single generating module for generating said synchronization codes, said correlation operations being implemented, at least in part, on said received and stored signal.

16. The method according to claim 12, wherein said correlation operations are performed by finite-impulse-response filters.

* * * * *

UNITED STATES PATENT AND TRADEMARK OFFICE
CERTIFICATE OF CORRECTION

| | | |
|---|---|---|
| PATENT NO. | : 7,123,929 B2 | Page 1 of 1 |
| APPLICATION NO. | : 10/717433 | |
| DATED | : October 17, 2006 | |
| INVENTOR(S) | : Giuseppe Avellone et al. | |

It is certified that error appears in the above-identified patent and that said Letters Patent is hereby corrected as shown below:

Title Page, (30) under Foreign Application Priority Data should read:

Dec. 13, 2002  (IT)  TO2002A1082

Signed and Sealed this

Ninth Day of January, 2007

JON W. DUDAS
*Director of the United States Patent and Trademark Office*